United States Patent [19]

Musselman et al.

[11] Patent Number: 5,480,587
[45] Date of Patent: Jan. 2, 1996

[54] MATERIALS FOR USE AS FIRE RETARDANT ADDITIVES

[75] Inventors: Lawrence L. Musselman, Apollo, Pa.; Howard L. Greene, Mogadore, Ohio

[73] Assignee: Aluminum Company of America, Pittsburgh, Pa.

[21] Appl. No.: 287,070

[22] Filed: Dec. 21, 1988

[51] Int. Cl.[6] .............................. C09K 21/00; B27N 9/00
[52] U.S. Cl. .......................... 252/609; 252/605; 252/607; 8/490; 162/159; 428/452; 428/453; 428/920; 428/921
[58] Field of Search ..................... 252/601, 605, 252/609, 607; 162/159, 161; 8/490, 116.1; 428/452, 453, 920, 921; 521/906, 907

[56] References Cited

U.S. PATENT DOCUMENTS

| | | | |
|---|---|---|---|
| 3,878,166 | 4/1975 | Woychesin et al. | 524/424 |
| 4,182,799 | 1/1980 | Rodish | 521/98 |
| 4,283,316 | 8/1981 | Bonsignore | 106/308 |
| 4,373,039 | 2/1983 | Mueller et al. | 523/205 |
| 4,390,653 | 6/1983 | Levendusky et al. | 524/322 |
| 4,496,680 | 1/1985 | Ashby | 524/265 |
| 4,514,328 | 4/1985 | Staendeke et al. | 252/609 |
| 4,600,634 | 7/1986 | Langer | 428/921 |
| 4,743,644 | 5/1988 | Skipper et al. | 524/437 |
| 4,842,772 | 6/1989 | Withiam | 252/601 |
| 4,883,533 | 11/1989 | Kosin et al. | 106/18.14 |

*Primary Examiner*—Howard J. Locker
*Attorney, Agent, or Firm*—David W. Pearce-Smith

[57] ABSTRACT

A method of modifying an inorganic material which evolves gases and/or vapors at a temperature which is detrimental to the processing temperature of polymer or paper systems so that the modified material can be used as a fire retardant additive with that polymer or paper system. The method comprises the steps of: (1) providing a first material; (2) treating the first material to remove the portion which evolves gas which is detrimental to the processing of the polymer or paper system; and (3) combining a second material with the first material to create a modified material which does not evolve gas at a temperature which is detrimental to the processing of the paper or polymer system.

26 Claims, 6 Drawing Sheets

DSC OF ALUMINA TRIHYDRATE (ATH) AND GLYCOL TREATED ATH

THERMALGRAVIMETRIC ANALYSIS
20°C/min FOR COARSE GROUND ATH

FIG. 1

DSC OF POLYESTER RESIN ALONE
AND FILLED WITH 60% ALUMINA TRIHYDRATE

FIG. 2

THERMALGRAVIMETRIC ANALYSIS
20°C/min FOR FINE GROUND ATH

FIG. 3

CUMULATIVE RATE OF LOSS OF COMBINED WATER
VERSUS TEMPERATURE FROM TGA DATA

DSC OF HYDROTALCITE (HT) AND CALCINED HT

WEIGHT GAIN OF CALCINED HT AND POTASSIUM
PYROANTIMONATE TREATED HT (PAHT)

FIG. 7

DSC FOR NaHCO₃ MODIFIED HT

FIG. 8

DSC FOR NH4OH MODIFIED HT

FIG. 9

DSC FOR NaBr MODIFIED HT

FIG. 10

MATERIALS FOR USE AS FIRE RETARDANT ADDITIVES

TECHNICAL FIELD

This invention relates to additive materials used as fire retardants in polymer compounds and paper. More particularly, the invention relates to modifying inorganic additives to change their ability to enhance the thermal stability of polymer compounds.

BACKGROUND ART

Endothermic particulate hydroxides have been identified as commercial or potentially commercial fire retardants in polymers, paper and other matrices in the literature. However, these materials have temperature limitations which limit the variety of polymer systems within which they can be used. These temperature limitations include the temperature in which the polymer system is processed and the temperature in which the fire retardant additive begins to decompose and act as a fire retardant.

For example, aluminum hydroxide (alumina trihydrate) is a well-known endothermic fire retardant additive or filler which has been found to be effective in several important polymer systems. It is commonly used at loadings of up to 75 weight percent of the polymer. Although alumina trihydrate is effective, its use is limited to polymers that are processed at temperatures below 220° C., the point where its water of hydration begins to evolve. At processing temperatures above about 220° C., alumina trihydrate decomposes to alumina and water vapor. The water vapor produces unacceptable surface defects and porosity in the finished product, and can damage processing equipment. Water vapor and/or steam which builds up in the processing equipment can cause both mechanical failure and injury to equipment operators.

It is the heat capacity and water of hydration of aluminum hydroxide that makes it effective as a fire retardant additive. To maintain burning in plastic systems, three ingredients need to be supplied: heat, fuel and oxygen.

Alumina trihydrate is effective as a fire retardant because its endothermic decomposition acts as a cooling heat sink to remove heat from the plastic—heat which would ordinarily go toward decomposing the plastic into the low molecular weight gaseous elements needed to sustain combustion. Water liberated from the decomposition of the hydrate also serves to inhibit the access of oxygen to the plastic systems. Thus, the addition of alumina trihydrate transforms an exothermic, fire-propagating polymer system into an endothermic, fire-retarding system.

Some of the common polymers for which alumina trihydrate finds use as a flame retardant include polyurethane, polyethylene, varieties of polypropylene having low processing temperatures and some unsaturated polyesters. Alumina trihydrate is compatible with these polymers because the endothermal decomposition temperature of the alumina (about 220°–300° C.) is above their processing temperatures.

Alumina trihydrate is not presently used as a flame-retardant additive in several other classes of polymers, including for example polyethylene terephthalate (PET), polybutylene-terephthalate (PBT), acrylonitride-butadienestyrene(ABS), nylon, and varieties of polypropylene having high process temperatures. When the trihydrate is added to such polymers, the trihydrate can decompose to alumina and water vapor during processing. The water vapor produces foaming or voids in the polymer matrix. These voids produce surface defects which are unacceptable for most final products.

Many other inorganics possessing "water of hydration" have not been widely used as fire retardants because their water releasing endothermic reactions occur at too low a temperature. One such material is hydrotalcite which is a magnesium aluminum carbonate hydroxide material having the general formula: $Mg_xAl_2(OH)_{2x+4}(CO_3).yH_2O$ where x varies from 3 to 6 and y varies from 2 to 4. Hydrotalcite has the potential of being a good fire retardant because it possesses water of hydration like hydrated alumina. However, it has not found widespread commercial acceptance as a fire retardant because it has several low temperature endotherms. The first of its endotherms can begin at about 50° C.

Attempts have been made in the past to calcine hydrotalcite at a temperature above the processing temperature of the polymer system in which it will be used. The calcined hydrotalcite could then be used as a fire retardant additive which releases its water of hydration at temperatures above the processing temperature of the polymer and below the decomposition temperature of the polymer. These attempts have not been very successful because the calcined material quickly rehydrates by pulling hydroxyl and carbonate groups from ambient air. Thus the calcined hydrotalcite must either be used immediately after calcining or stored in a manner that will prevent it from reverting back to its original composition. Neither of these alternatives has been found to be commercially viable.

There currently exists a need for low-cost additive materials that can be used as fire retardants in polymer systems processed at higher temperature. There also exists a need for low-cost materials that have endotherms which begin at temperatures that are either higher or lower than alumina trihydrate. The endotherms of these materials must be matched to the processing temperatures and/or exothermic characteristics of each polymer system involved.

In addition, a need exists for a method of converting materials that evolve gas at temperatures which are detrimental to the processing of polymer systems, such as hydrotalcite, into materials that do not evolve gas at temperatures which are detrimental to the processing of polymer systems and possess a fire retarding endotherm below the decomposition temperature of the polymer.

The principal object of the present invention is to provide additive material for use as a fire retardant in polymer, paper and other matrices.

Another principal object of the invention is to provide a method of converting materials that evolve gas at temperatures which are detrimental to the processing of polymer systems, such as hydrotalcite, into materials that do not evolve gas at temperatures which are detrimental to the processing of polymer systems and possess a fire retarding endotherm below the decomposition temperature of the polymer.

Another object of the invention is to provide an additive material for use as a fire retardant in polymer systems which possesses enhanced thermal stability.

Another object of the invention is to provide a method of increasing the fire resistance of a known fire retardant by increasing the magnitude of its endotherm.

A further object of the invention is to provide an additive material for use in flame-retardant polymer systems which possesses enhanced thermal stability at higher temperatures.

Still another object of the invention is to provide a method of increasing the usefulness of known fire retardants by changing the temperature at which they begin to act as fire retardants.

Another object of the present invention is to provide a method of creating a new additive material for use as a fire retardant in polymer systems which is designed to meet the specific needs of that polymer system.

Additional objects and advantages of the present invention will be more fully understood and appreciated with reference to the following description.

DISCLOSURE OF THE INVENTION

In accordance with the present invention, a method is disclosed for modifying an inorganic material which evolves gases and/or vapors at a temperature which is detrimental to the processing temperature of a polymer or paper system. The modified material of the present invention can be used as a fire retardant additive in that polymer or paper system. The method comprises the steps of: (1) providing a first material; (2) treating the first material to remove the portion which evolves gas which is detrimental to the processing of the polymer or paper system; and (3) combining a second material with the first material to create a modified material which does not evolve gas at temperatures which are detrimental to the processing of the polymer or paper system.

In a preferred embodiment of the invention, the water of hydration of alumina trihydrate is removed by heat treating. The liberated water is then replaced with an organic or inorganic substance such as ethylene glycol to create a new aluminate material which has its lowest temperature endotherm at a temperature higher than the initial alumina trihydrate material. The new aluminate is compatible with polymers having a processing temperature greater than 220° C., the temperature at which alumina trihydrate begins to decompose. Examples of polymers in which the new aluminate material finds use include PET, nylon and varieties of polypropylene.

In a second preferred embodiment of the invention, hydrotalcite is heat treated at a temperature which removes the portion that normally would evolve as gas during the processing of a polymer. The calcined material is then combined with a second material such as potassium pyroantimonate that acts as a sealant to prevent the calcined material from rehydrating when it is exposed to ambient conditions. The modified hydrotalcite material can then be used as a fire retardant additive in polymer systems where the original hydrotalcite material would have caused a dangerous situation. In addition, the modified hydrotalcite material can also be used as a fire retardant additive without taking special precautions to prevent it from quickly rehydrating in ambient air.

In a third preferred embodiment of the invention, the material which evolves gas which is detrimental to the processing of the polymer or paper system is heat treated at a temperature which removes the portion that normally would evolve as gas during the processing of a polymer and then reacted with an inorganic substance such as ammonium hydroxide, sodium bicarbonate, or sodium bromide to create a new material possessing endothermic properties which are different than the initial material. This new material can then be used as an additive in the processing of the polymer without evolving gases.

The present invention permits one skilled in the art to design individual and/or families of new fire retardant materials, each of which is stable through a particular processing temperature. The new fire retardants will have very precise endothermic properties that can be matched to the characteristic exothermic properties of a particular polymer system. For example, by precise thermal and chemical treatment, magnesium aluminum carbonate hydroxide can be transformed from a material that has substantial weight loss of hydroxyl and carbonate groups starting at about 50° C. to a material stable to processing temperatures over 300° C., One skilled in the art will easily be able to determine with which polymer systems this new material is compatible,

BRIEF DESCRIPTION OF THE DRAWINGS

Other features of the present invention will be further described or rendered obvious in the following related description of the preferred embodiment which is to be considered together with the accompanying drawings, wherein.

BEST MODE FOR CARRYING OUT THE INVENTION

As previous stated, aluminum hydroxide is known to be an effective flame-retardant additive for several polymeric materials. By the term aluminum hydroxide, we mean $Al_2O_3.3H_2O$. Historically, the terms aluminum hydroxide, alumina hydrate, gibbsite, alumina trihydrate (ATH) and hydrated alumina have been used to describe $Al_2O_3.3H_2O$. The most technically correct term of these terms is aluminum hydroxide which is based on the chemical formula $Al(OH)_3$. However, the most common term used is alumina trihydrate. For convenience, we will use the term alumina hydrate to refer to $Al_2O_3 \cdot H_2O$ where X varies from 1 to 3 and the water of hydration varies from 15.0 to 34.6 percent by weight of the alumina hydrate. Alumina hydrate which is modified according to the present invention can be obtained from many sources, most commonly as a product of the Bayer process.

The reason the term alumina trihydrate has become more common and thus the preferred term over alumina hydroxide is the unique characteristic that upon decomposition approximately 34.6% by weight is released as water. This "water of hydration" is stable to between 220° and 230° C. at the process heating rates and residence times used in many plastics processing systems. Upon heating alumina trihydrate to temperatures higher than about 220° to 230° C., the hydrate (hydroxyl groups) begins to decompose endothermically. The by-products of decomposition are simply anhydrous alumina and water:

$$2Al(OH)_3 \rightarrow Al_2O_3 + 3H_2O.$$

The water is liberated in the form of gaseous oxygen and hydrogen. The measured enthalpy (heat of dehydroxylation) for alumina trihydrate is 280 cal/g.

Figure 1:
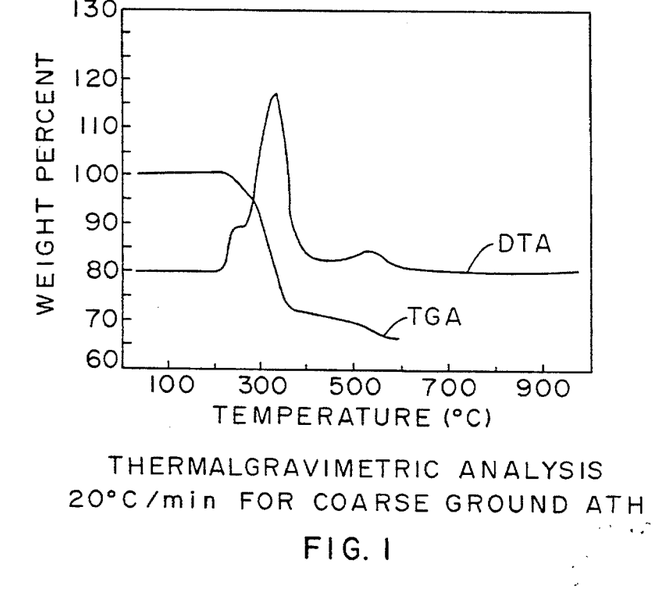
FIG. 1 is a graphical illustration of the thermalgravimetric analysis and differential thermal analysis of coarse ground alumina trihydrate.

When alumina trihydrate is used as a fire retardant in polymer systems, its considerable absorption of heat makes less heat available for decomposing a polymer system into the low molecular weight fuel gases that support combustion. This phenomenon is graphically illustrated in FIG. 1 by comparative thermalgravimetric analysis (TGA) for weight loss and differential thermal analysis (DTA) for heat absorption with temperature for a coarse ground alumina trihydrate (ATH).

Figure 2:
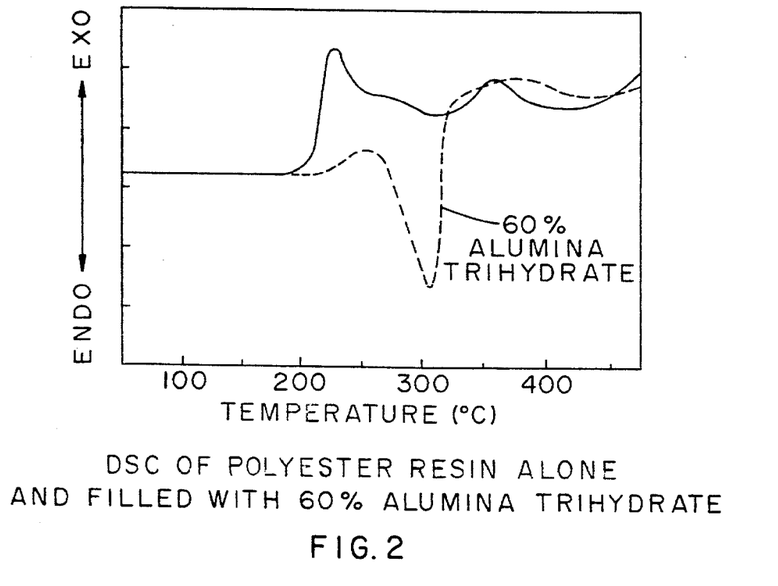
FIG. 2 is a graphical illustration of the differential scanning calorimeter measurements of polyester resin alone and polyester resin filled with 60% alumina trihydrate.

FIG. 2 illustrates the thermal analysis using differential scanning calorimetry (DSC) of a typical polymer system (polyester resin) with and without the addition of alumina trihydrate. FIG. 2 illustrates how the addition of 60% alumina trihydrate transforms the polymer system from an exothermic, fire-propagating polymer system at temperatures above about 200° C. into an endothermic, fire-retarding system.

Figure 3:
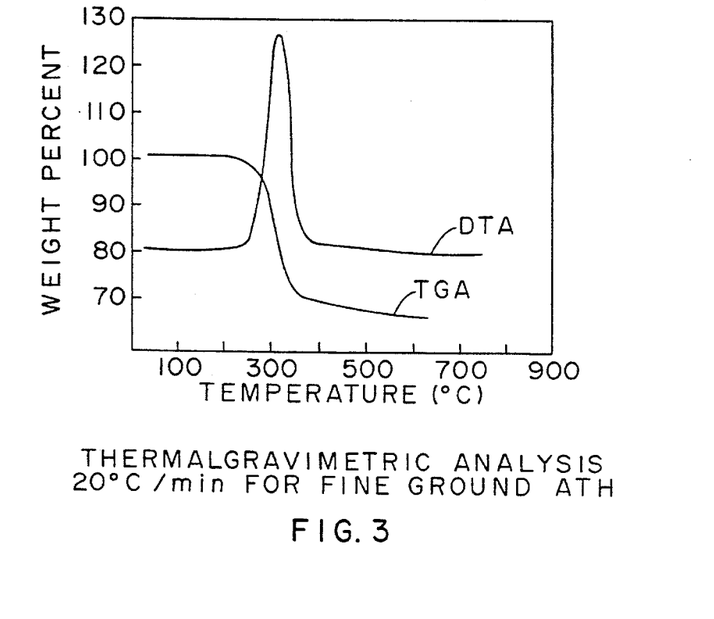
FIG. 3 is a graphical illustration of the thermalgravimetric analysis of fine ground precipitated alumina trihydrate.

FIG. 3 illustrates the thermalgravimetric analysis of superfine ground precipitated alumina trihydrate. Viewing FIG. 3 and FIG. 1 together, one can see a slight change in TGA and DTA when alumina trihydrate is provided as a superfine precipitated material. The fine alumina trihydrate, shown in FIG. 3, has a much smoother initial hydrothermal transformation and decomposition than the coarse ground material shown in FIG. 1. Providing alumina trihydrate as a superfine precipitate, rather than as a coarser ground product, does not produce a significant change in the temperature at which the hydrate (hydroxyl groups) begins to decompose endothermically.

Figure 4:
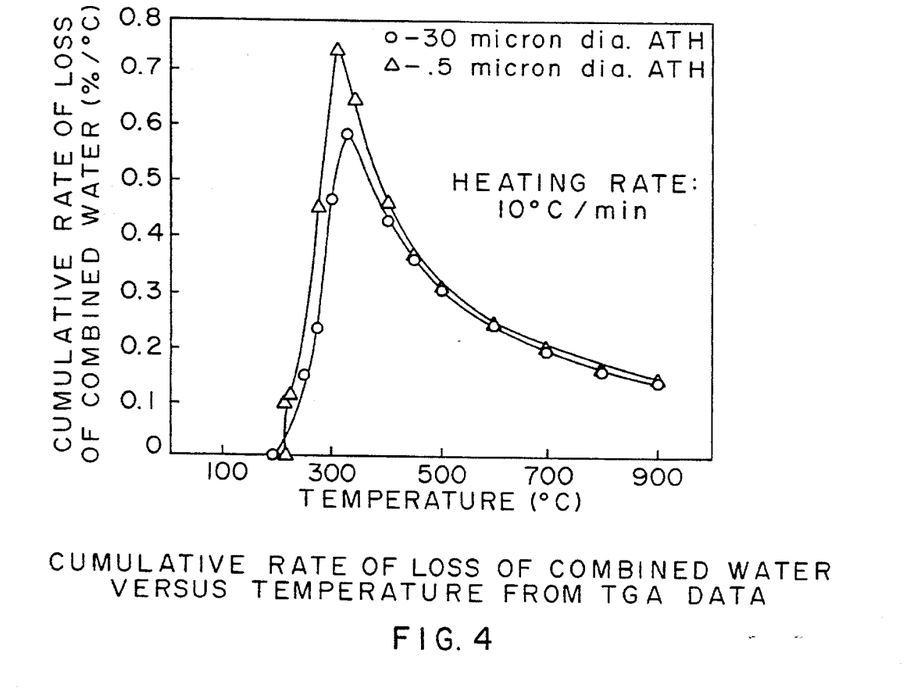
FIG. 4 is a graphical illustration of the cumulative rate of loss of combined water versus temperature for 30 micron and 0.5 micron alumina trihydrate.

FIG. 4 illustrates the cumulative rate of loss of combined water versus temperature for 30 micron and 0.5 micron alumina trihydrate. FIG. 4 shows that more heat absorbing capacity is available at the major endothermic peak for superfine precipitated alumina trihydrate than for coarse alumina trihydrate. This increase in heat absorbing capacity is not due to an increase in the overall endothermic capacity of the alumina trihydrate. Rather, it is due to the fact that substantially all of the superfine alumina trihydrate decomposes at this temperature. A comparison of FIGS. 1 and 3 reveals that the coarser alumina trihydrate has a two-step decomposition while the fine ground alumina experiences its decomposition in one step. The second endotherm of the coarse ground material is shown by the second small peak in the top curve in FIG. 1 at between 500° and 600° C. The particle size of alumina trihydrate used as an additive does not have a significant effect on the total magnitude of its fire-retarding capacity.

Surprisingly, it has been found that both the magnitude and the temperature of alumina trihydrate's endotherm can be increased if alumina trihydrate is treated in accordance with the present invention. Alumina trihydrate can be transformed from a material which has a substantial weight loss beginning at about 220°–230° C. to a material stable to over 330° C. The modified alumina trihydrate is stable to a processing temperature much higher than the boiling point of the substituted material. For example, when alumina trihydrate is calcined and ethylene glycol is substituted at the site of the water of hydration, a vapor pressure lowering effect occurs which keeps the glycol stable in the modified alumina trihydrate substrate to a temperature greater than 100° C. above its vaporization temperature. This vaporization temperature elevation is unexpected. Even more surprisingly, it has been found that alumina trihydrate's normal fire retarding endotherm of 280 cal/g can be more than doubled to over 650 cal/g by substituting ethylene glycol for its water of hydration.

The polymer systems in which the materials of the present invention find use as a fire retardant additive include, but are not limited to, latexes, polypropylene, polyester and polyamide carpet grade polymers such as nylon, polyurethane compositions, polystyrene, PET, varieties of molding grade polypropylenes such as polypropylene-homopolymer, and polypropylene-copolymers and blends thereof, ethylene polymer compositions including low density polyethylene, ethylene-vinyl acetate copolymers and ethylene ethyl acrylate copolymers, nylon compositions including nylon 6, nylon 6,6, nylon 6,10, nylon 11 and nylon 12 and other similar thermoplastic, thermosetting and elastomeric polymer systems.

Materials that may be used in practicing the present invention include, but are not limited to, alumina trihydrate, hydrotalcite, as well as other endothermic and/or non-endothermic substances. Some known endothermic materials (fire retardants) that can be used in the present invention include synthetic or natural zeolites, other alumina hydrates such as alumina monohydrate, aluminum hydroxide ($Al(OH)_3$), aluminum nitrate ($Al(NO_3)_3.9H_2O$), ammonium alum ($Al_2(SO_4)_3.(NH_4)_2SO_4.24H_2O$), potassium alum or kalimite ($Al_2(SO_4)_3.K_2SO_4.24H_2O$), and other inorganic hydroxides such as barium chloride ($BaCl_2.2H_2O$), barium peroxide ($Ba_2O_2.8H_2O$), borax or sodium tetraborate decahydrate ($Na_2B_4O_7.10H_2O$), calcium borate ($Ca(BO_2)_2.2H_2O$), calcium sulfate ($CaSO_4.2H_2O$), calcium sulfite ($CaSO_3.2H_2O$), calcium phosphate ($CaH_4(PO_4)_2.H_2O$), magnesium pyrophosphate ($Mg_2P_2O_7.3H_2O$), magnesium ammonium chloride ($MgCl_2.NH_4CL.6H_2O$), magnesium carbonate or nesquehonite ($MgCO_3.3H_2O$), sodium diboric phosphate ($Na_2HPO_4.12H_2O$), sodium tribasec phosphate ($Na_3PO_4.12H_2O$), sodium meta silicate ($Na_2SiO_3.9H_2O$), sodium sulfate ($Na_2SO_4H_2O$), sodium carbonate or soda ash ($Na_2CO_3.H_2O$), and zinc nitrate ($Zn(NO_3)_2.6H_2O$).

Materials other than those containing water of hydration may be used in practicing the present invention. Thus, one could use inorganic carbonates and heat the inorganic carbonate to remove the carbonate which is detrimental to polymer processing and then fill the carbonate site with a material that will produce a new endotherm which is useful as a fire retardant. Examples of inorganic carbonates include, but are not limited to, hydrotalcite, dawsonite, zinc carbonate ($ZnCO_3$), magnesium carbonate or nesquehonite ($MgCO_3.3H_2O$), sodium carbonate or soda ash ($Na_2CO_3.H_2O$) and combinations and/or partial hydrates thereof.

Materials that may be substituted into the site created by the removal of the water of hydration and/or carbonate include, but are not limited to, inorganic salt solutions such as lithium, sodium, and potassium salts and organic materials like glycols, such as ethylene glycol or propylene glycol, silicone oils, as well as materials that involve direct ionic substitution into the crystal lattice of the various substrates. Examples of inorganic salts include sodium phosphate, sodium bromide, sodium borate, sodium sulfate, sodium dichromate, sodium metaphosphate, sodium carbonate, sodium bicarbonate, ammonium hydroxide, ammonium borate, ammonium molybdate, sodium silicate and sodium hypophosphate. Examples of organic materials include various carboxylic acids, stearic acid, maleic acid, oxalic acid, sebacic acid.

The present invention teaches a new concept in preparing fire retardant materials. It is contemplated that this new concept teaches enough so that routine engineering skills are all that are required to calcine the initial material or to otherwise develop sites for intrusion, sealing or reaction and then substitute a new material at the site to create a new fire retardant material. The new fire retardants created can then be routinely tested to determine the magnitude and temperature of its endotherms to evaluate the new material and determine in which polymer systems it can be most advantageously used.

The following examples illustrate preferred modes of practicing the present invention.

EXAMPLE 1

Figure 5:
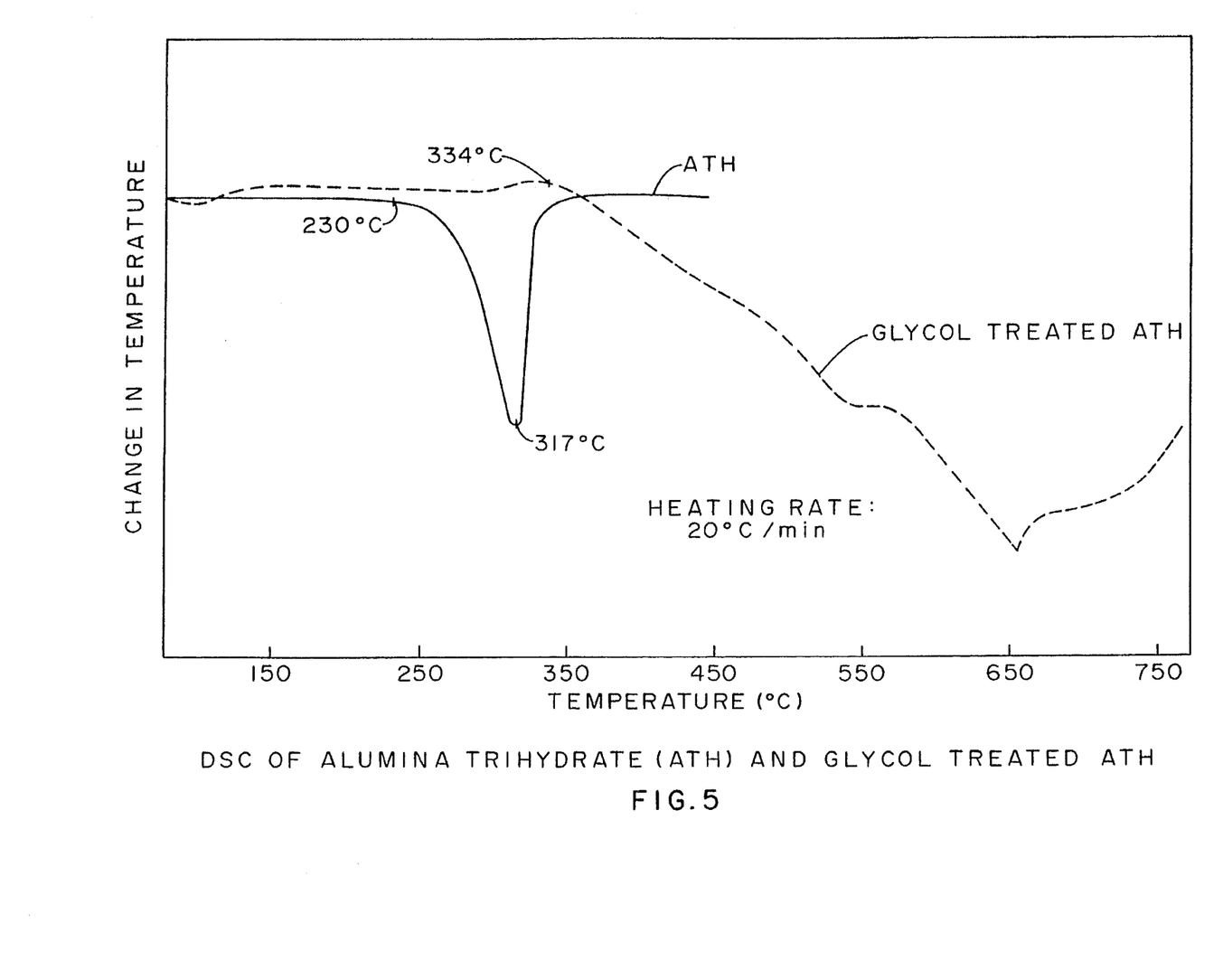
FIG. 5 is a graphical illustration of the differential scanning calorimeter measurements of alumina trihydrate and alumina trihydrate which has been calcined and treated with glycol.

Alumina hydrate was placed in a differential scanning calorimeter and tested. The results are shown as the solid line in FIG. 5. Example 1 was performed as a control. The material used in Example 1 is currently used as a fire retardant. It was found to have an endotherm of 280 cal/g which begins at approximately 230° C. The endotherm is from water evolved from heating the sample.

EXAMPLE 2

Alumina hydrate from the same source as the material used in Example 1 was heated to 300° C. to drive off the water of hydration. After 1½ hours at 300° C., the material was placed in boiling (190° C.) ethylene glycol. Immediately afterwards, the hot material was filtered and dried in an oven at 170° C. Excess ethylene glycol was removed by filtration and then drying the material. The material of Example 2 was then placed in a differential scanning calorimeter and tested. The results are shown as the dotted line in FIG. 5. The material of Example 2 was found to have an endotherm of 640 cal/g which begins at approximately 334° C.

Surprisingly, the process of Example 2 has produced a material having an endotherm which is 228% greater than the magnitude of the endotherm of the starting material. This increase is much larger than the increase from changing the particle size of the material. In addition, the endotherm of the material of Example 2 began at a temperature approximately 104° C. higher than the endotherm of the material of Example 1. The vaporization (or endotherm initiation) temperature of the material of Example 2 is higher than that calculable from any known theory for vapor pressure lowering effects.

EXAMPLE 3

Figure 6:
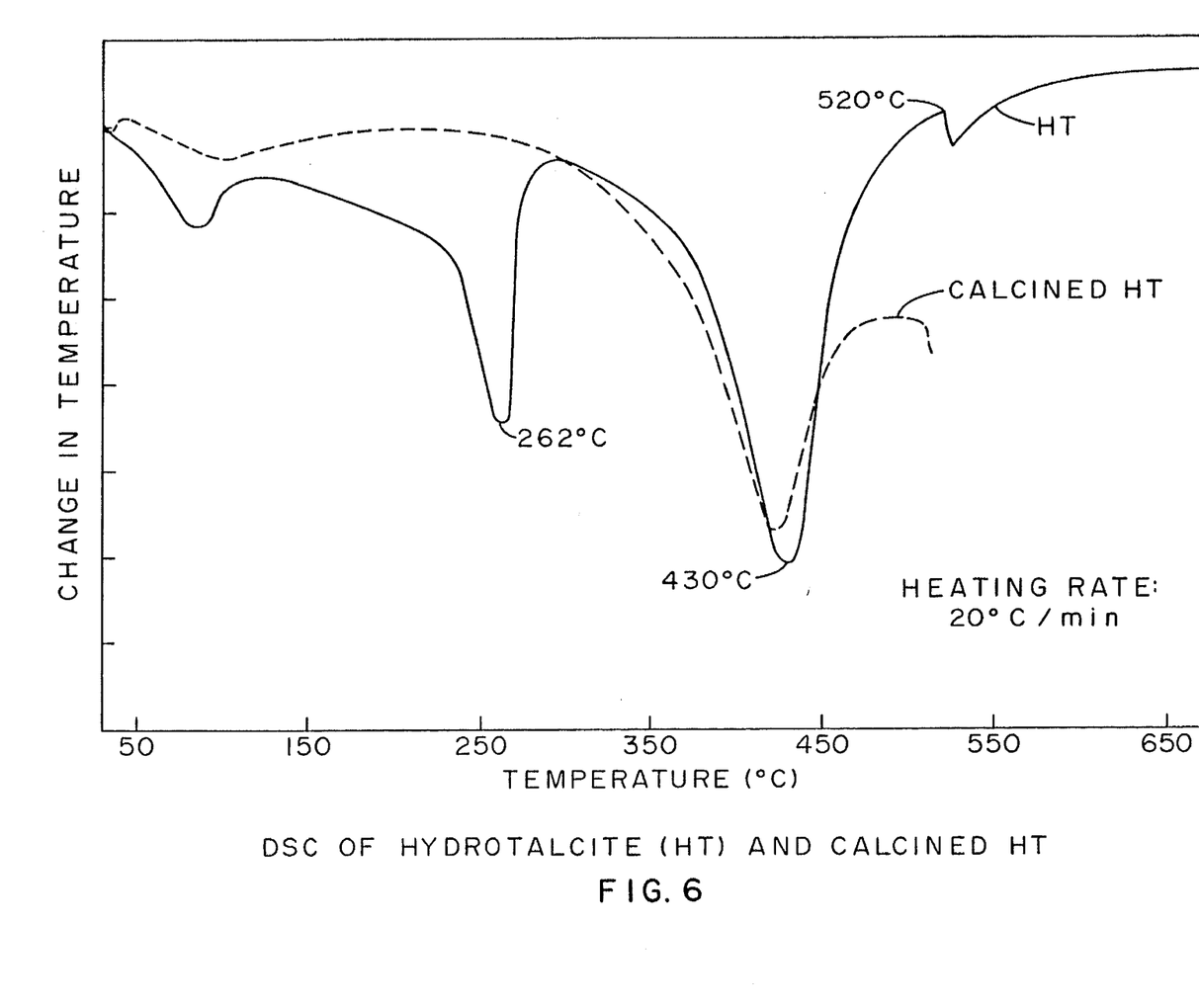
FIG. 6 is a graphical illustration of the differential calorimeter measurements of hydrotalcite and calcined hydrotalcite.

Hydrotalcite (magnesium aluminum carbonate hydroxide) material from the Bayer process operation was placed in a differential scanning calorimeter and tested. The hydrotalcite material was formed by adding MgO to Bayer liquor to remove impurities and form hydrotalcite. Hydrotalcite material from other sources may also be used. The results are shown as the solid line in FIG. 6. The material of Example 3 was tested as a control. Hydrotalcite (HT) is not widely used in polymer systems because of its broad endotherm which begins at approximately 50° C. If hydrotalcite is used in polymer systems that are processed at temperatures above 86° C., it could create large surface defects in finished products or cause catastrophic pressure buildup during the thermal cycle of the polymer's molding operation.

EXAMPLE 4

Hydrotalcite waste material from the Bayer process was heated to 250° C. to drive off its hydroxyl and carbonate groups. After 2 hours at 250° C., the calcined material was immediately placed in a differential scanning calorimeter and tested in the same manner as Example 3. The results are shown as the dotted line in FIG. 6. The calcined material had an endotherm which started at about 250° C. and peaked at about 420° C.

EXAMPLE 4

Figure 7:
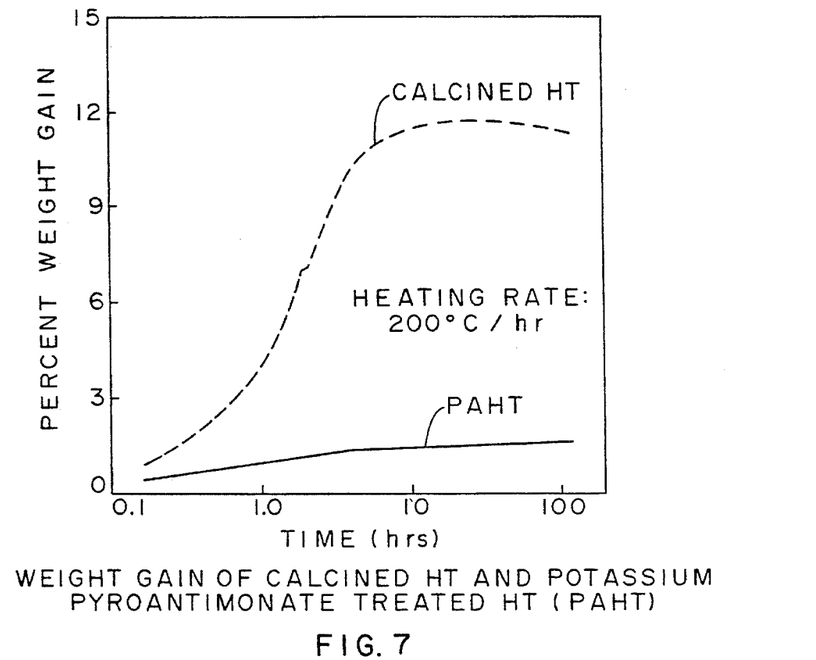
FIG. 7 is a graphical illustration of the weight gain of calcined hydrotalcite and hydrotalcite which has been calcined and treated with potassium pyroantimonate.

Hydrotalcite material was heat treated as in Example 4. Immediately after calcining, the material was divided into samples 5A and 5B. Sample 5A was placed in the oven and held at 200° C. while sample 5B was being processed. After calcining, sample 5B was immediately sealed with potassium pyroantimonate to prevent the calcined material from picking up ambient moisture. Potassium pyroantimonate was selected because at low levels it will not add any significant endothermic value to the calcined material. Samples 5A and 5B were then exposed to air at room temperature having a relative humidity of 50%. The samples were periodically weighed and the weights were used to generate the weight gain curves shown in FIG. 7. After ten minutes' exposure to air, sample 5A had an almost 1.5% weight gain. This weight gain increased to nearly 12% after 10 hours. Sample B had less than a 1% weight gain after ten minutes and approximately 2% weight gain after 10 hours. Coating the heat treated hydrotalcite with potassium pyroantimonate reduced the weight gain from exposure to free moisture in the air to a level acceptable for use in many polymer systems.

EXAMPLE 6

Figure 8:
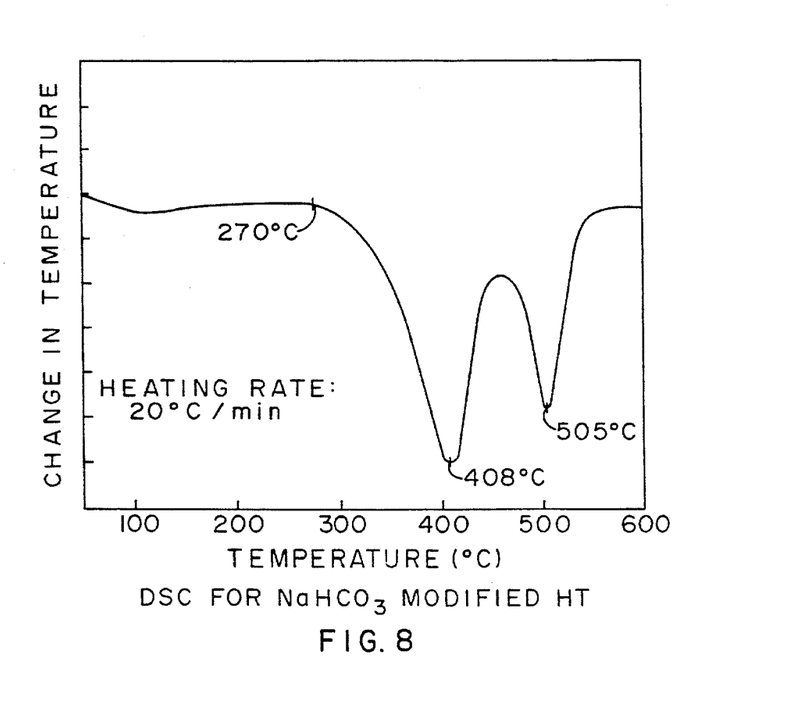
FIG. 8 is a graphical illustration of the differential calorimeter measurements of hydrotalcite which has been partially calcined and reacted with $NaHCO_3$.

Hydrotalcite material was heated to 300° C. to drive off its hydroxyl and carbonate groups. After 4 hours at 300° C., the material was immediately placed in a boiling aqueous solution containing sodium carbonate ($NaHCO_3$) for one hour. Afterwards, the material was filtered and dried in an oven at 200° C. for one hour. The material was then placed in a differential scanning calorimeter and tested in the same manner as Example 3. The test results are shown in FIG. 8. The material of Example 6 was found to have its first endotherm which was calculated to be 957 Joules per gram. The first endotherm began at approximately 270° C. and peaked at 408.90° C. The material of Example 6 also had a second endotherm which was calculated to be 201 Joules per gram. This endotherm peaked at approximately 505.39° C. The total endothermic capacity of the material was 1158 Joules per gram.

EXAMPLE 7

Figure 9:
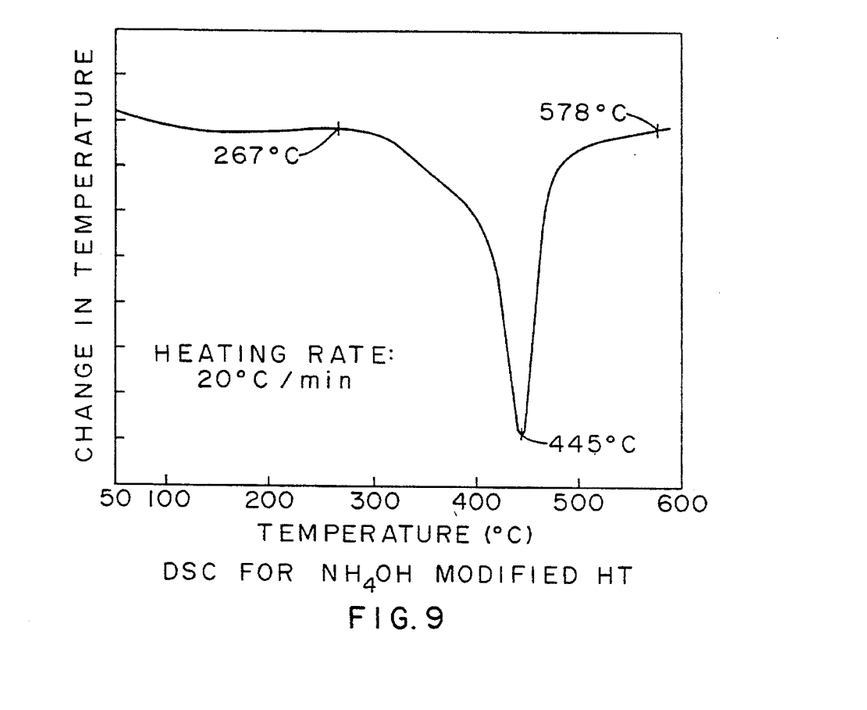
FIG. 9 is a graphical illustration of the differential calorimeter measurements of hydrotalcite which has been calcined and reacted with $NH_4OH$.

The process of Example 6 was repeated using ammonium hydroxide ($NH_4OH$) instead of $NaHCO_3$ to modify the hydrotalcite. The results of differential scanning calorimetry are shown in FIG. 9. The material of Example 7 was found to have its first endotherm at 445° C. This endotherm began at 268° C. and was calculated to be 1206 Joules per gram.

EXAMPLE 8

Figure 10:
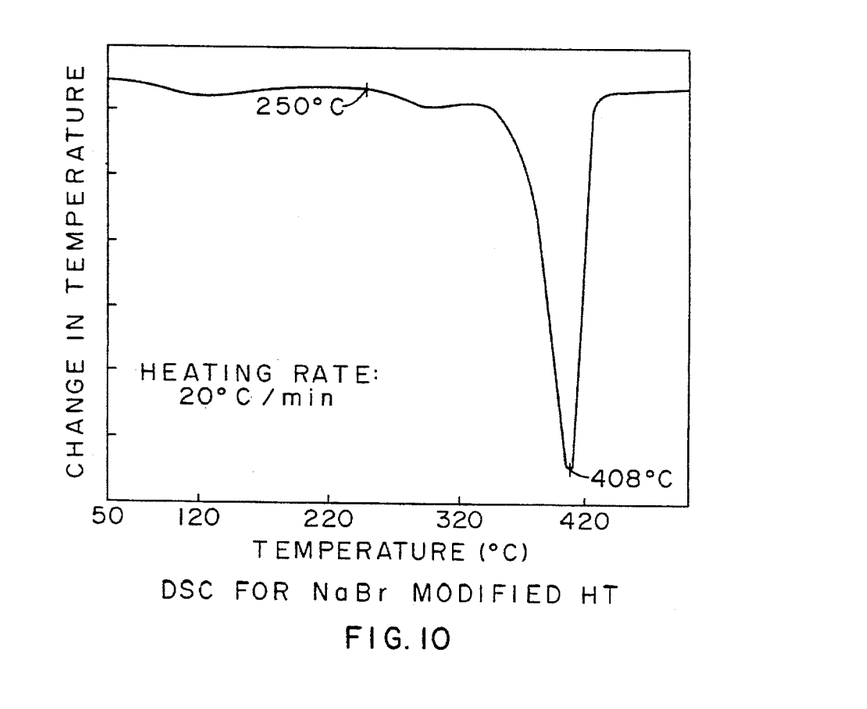
FIG. 10 is a graphical illustration of the differential calorimeter measurements of hydrotalcite which has been partially calcined and reacted with NaBr.

The process of Example 6 was repeated using sodium bromide (NaBr) instead of $NaHCO_3$ to modify the hydrotalcite. The results of differential scanning calorimetry are shown in FIG. 10. The material of Example 8 was found to have its first endotherm at 408° C. This endotherm began at 250° C. and was calculated to be 655 Joules per gram.

EXAMPLE 9

Three samples were prepared for use as a 63% weight addition to nylon 6. Sample 9A was prepared by heating hydrotalcite material to 300° C. to drive off its hydroxyl and carbonate groups. After 2 hours at 300° C., the material was immediately placed in a boiling solution of methanol containing stearic acid for one hour. Afterwards, the material was filtered and dried in an oven at 200° C. for one hour. Sample 9B was prepared in a manner similar to sample 9A except that the calcined material was placed in a boiling solution of methanol containing ethylene glycol for one hour. These samples were added by two roll mill compounding as a 63% weight addition to nylon 6. A control sample, sample 9C, was also prepared which contained no fire retardant additive. The specimens were prepared by compression molding flat sheet and cutting it to the proper size. Oxygen index fire testing was then performed on a specimen taken from each sample. Oxygen index is a flammability test for plastics, ASTM D-2863-74. This method describes a procedure for determining the relative flammability of cellular plastics by measuring the minimum concentration of oxygen in a slowly rising mixture of oxygen and nitrogen that will just support combustion. The higher the oxygen index, the more fire retardant the material. The oxygen index value for the tested materials was as follows:

| Sample 9A | 39 |
| Sample 9B | 49 |
| Sample 9C | 20 |

It is contemplated that the times and temperatures used in calcining to remove the water of hydration and/or carbonate may be varied without departing from the invention. The exact temperature used will depend on the material and the temperatures at which it evolves gas, as well as the processing temperatures of the polymer system in which it is to be used.

It is also contemplated that methods other than heating or calcining may be used to remove the water of hydration which is detrimental to polymer processing. Thus, for example, the water of hydration may be removed by direct chemical reaction.

Since changes may be made in the processes described in the above examples without departing from the scope of the invention herein involved, it is intended that all matter contained in the above description or shown in the accompanying drawings shall be interpreted as illustrative. The present invention is indicated by the broad general meaning of the terms in which the appended claims are expressed.

What is claimed is:

1. A method of modifying a material to enhance and its usefulness as a filler in a paper or polymer system, said method comprising the steps of:

providing an inorganic material which evolves gas upon heating;

treating said inorganic material to remove the portion of said inorganic material which evolves as a gas that is detrimental to the processing of a paper or polymer system; and combining a second material with said inorganic material to form a modified material having a reduced tendency to evolve gas at a temperature which is detrimental to said processing of the polymer or paper system.

2. The method of claim 1 in which said step of treating said inorganic material further includes:

treating said inorganic material wherein said inorganic material is selected from the group consisting of alumina trihydrate, aluminum magnesium carbonate hydroxide having the formula $Mg_xAl_2(OH)_{2x+4}(CO3).yH_2O$ where x varies from 3 to 6 and y varies from 2 to 4, aluminum sodium carbonate hydroxide, and aluminum hydroxide to remove the water of hydration or carbonate of said first material which evolves as a gas that is detrimental to the processing of a paper or polymer system.

3. The method of claim 1 in which said step of treating said first material includes:

heat treating said first material.

4. The method of claim 1 which includes:

providing an inorganic material which contains carbonate which evolves as carbon dioxide upon heating; and treating said inorganic material to remove carbonate that is detrimental to the processing of said polymer system.

5. The method of claim 1 which includes:

providing an inorganic material which contains water of hydration which evolves as water upon heating; and treating said inorganic material to remove water of hydration that is detrimental to the processing of said polymer system.

6. The method of claim 1 in which said step of treating said inorganic material includes:

providing an inorganic material containing hydrotalcite; and heating said hydrotalcite to a temperature below approximately 300° C.

7. The method of claim 2 in which said step of combining a second material includes:

substituting a second material at the site where the water of hydration or carbonate was removed from said inorganic material, said second material creating a new endotherm on said inorganic material which occurs at a temperature which is useful as a fire retardant, said new endotherm being greater in magnitude than the endotherm of said inorganic material after said water of hydration or carbonate has been removed.

8. The method of claim 2 in which said step of combining a second material includes:

substituting a second material at the site wherein the water hydration or carbonate was removed from said inorganic material, said second material creating no new endotherm.

9. The method of claim 2 in which said step of treating said inorganic material includes:

treating alumina trihydrate.

10. The method of claim 9 in which said step of treating said first material includes:

heating said alumina trihydrate to 300° C.

11. The method of claim 9 in which said step of combining a second material includes:

placing said alumina trihydrate in boiling ethylene glycol.

12. The method of claim 1 in which said step of combining a second material includes:

placing said inorganic material in boiling ethylene glycol.

13. The method of claim 1 in which said step of combining a second material includes:

combining a second material selected from the group consisting of, sodium bromide, sodium borate, sodium sulfate, sodium nitrate, zinc sulfate, potassium bicarbonate, potassium pyroantimonate, sodium hydroxide, sodium dichromate, sodium metaphosphate, sodium carbonate, ammonium hydroxide, ammonium borate, ammonium molybdate, sodium silicate, sodium bicarbonate and sodium phosphate.

14. The method of claim 1 in which said step of treating said inorganic material further includes:

treating said inorganic material selected from the group consisting of alumina monohydrate, aluminum nitrate, ammonium alum, potassium alum or kalimite, barium chloride, barium peroxide, borax or sodium tetraborate decahydrate, calcium borate, calcium sulfate, calcium sulfite, calcium phosphate, magnesium pyrophosphate, magnesium ammonium chloride, magnesium carbonate or nesquehonite, sodium diboric phosphate, sodium triboric phosphate, sodium meta silicate, sodium sulfate, sodium carbonate or soda ash, zeolite, and zinc nitrate.

15. A fire retardant material having enhanced usefulness in a polymer or paper system, said fire retardant material formed by the steps of:

treating a first material containing water of hydration or carbonates to remove the portion of water hydration or carbonate of said first material which evolves as a gas that is detrimental to the processing of the polymer or paper system; and combining a second material with said first material to create said fire retardant material which has a reduced tendency to evolve gas at a temperature which is detrimental to said processing of the polymer or paper system.

16. The fire retardant material of claim 15 in which said first material is selected from the group consisting of aluminum hydroxide, alumina hydrate, aluminum magnesium carbonate hydroxide having the formula $Mg_xAl_2(OH)_{2x+4}(CO3).yH_2O$ where x varies from 3 to 6 and y varies from 2 to 4, aluminum sodium carbonate hydroxide, zeolite and combinations thereof.

17. The fire retardant material of claim 15 in which said second material is selected from the group consisting of sodium bromide, sodium borate, sodium sulfate, sodium dichromate, sodium nitrate, zinc sulfate, potassium bicarbonate, potassium pyroantimonate, sodium hydroxide, sodium metaphosphate, sodium carbonate, ammonium hydroxide, ammonium borate, ammonium molybdate, sodium silicate, sodium bicarbonate and sodium phosphate.

18. A filler material for use in a polymer or paper system, said filler material formed by the steps of:

heating a first inorganic material which evolves gas heating to remove the portion of said first material which evolves as a gas that is detrimental to the processing of the polymer or paper system; and sealing the surface of said first material at the site where said gas evolved from said first material to create a new filler material having a reduced tendency to evolve gas at a temperature which is detrimental to said processing of said polymer or paper system.

19. The filler material of claim 18 in which said first material is hydrotalcite.

20. A method of modifying a material for use as a filler in a paper or polymer system, said method comprising the steps of:

heating a first material containing water of hydration or carbonate to remove the portion of water hydration or carbonate of said first material which evolves as a gas that is detrimental to the processing of the polymer or paper system; and intruding a second material into the surface of said first material to create a new material having a reduced tendency to evolve gas at a temperature which is detrimental to said processing of the polymer or paper system.

21. A fire retardant system used to form a fire retardant product, said fire retardant system formed by the steps of:

providing a first material;

treating said first material containing water of hydration or carbonate to remove the portion of water of hydration or carbonate of said first material which evolves as a gas that is detrimental to the processing of said polymer system;

combining a second material with said first material to create a fire retardant material having a reduced tendency to evolve gas at a temperature which is detrimental to said processing of said polymer system; and adding said fire retardant material to a polymer to form a first retardant product.

22. The fire retardant system of claim 21 in which said polymer is selected from the group consisting of latexes, polyester polyamide, polyurethane, polystyrene, PET, polypropylenes, ethylene and nylon.

23. A method of modifying alumina hydrate material for use as a filler in a polymer or paper system that is processed above 220° C., said method comprising the steps of:

calcining alumina hydrate to a temperature above 220° C. to remove the water of hydration which is detrimental to the processing of the paper or polymer system; and combining a second material with said calcined alumina hydrate to create a modified material which does not evolve gas at a temperature which is detrimental to said processing of the polymer or paper system.

24. The method of claim 23 in which said step of substituting a second material includes:

placing said alumina hydrate in boiling ethylene glycol.

25. A method of modifying magnesium aluminum carbonate hydroxide for use as a filler in a polymer or paper system that is processed above 50° C., said method comprising the steps of:

heating magnesium aluminum carbonate hydroxide, having the formula $Mg_xAl_2(OH)_{2x+4}(CO3).yH_2O$ where x varies from 3 to 6 and y varies from 2 to 4, to evolve the water of hydration and carbonate; and combining a second material with said magnesium aluminum carbonate to create a modified material which does not evolve gas at a temperature which is detrimental to said processing of the polymer or paper system.

26. A method comprising the steps of:

providing an inorganic material containing water of hydration or carbonate selected from the group consisting of alumina hydrate, aluminum magnesium carbonate hydroxide having the formula $Mg_xAl_2(OH)_{2x+4}(CO3).yH_2O$ where x varies from 3 to 6 and y varies from 2 to 4, aluminum sodium carbonate hydroxide, aluminum hydroxide and combinations thereof;

removing the portion of water of hydration or carbonate of said inorganic material which evolves as a gas that is detrimental to the processing of paper or polymer systems;

providing a second material selected from the group consisting of sodium bromide, sodium borate, sodium sulfate, sodium nitrate, zinc sulfate, potassium bicarbonate, potassium pyroantimonate, sodium hydroxide, sodium dichromate, sodium metaphosphate, sodium carbonate, ammonium hydroxide, ammonium borate, ammonium molybdate, sodium silicate, sodium bicarbonate and sodium phosphate; and combining said second material with said first material to form a modified material having a reduced tendency to evolve gas at a temperature which is detrimental to said processing of the polymer or paper system.

* * * * *

UNITED STATES PATENT AND TRADEMARK OFFICE
CERTIFICATE OF CORRECTION

PATENT NO. : 5,480,587
DATED : January 2, 1996
INVENTOR(S) : Lawrence L. Musselman et al It is certified that error appears in the above-indentified patent and that said Letters Patent is hereby corrected as shown below:

| | |
|---|---|
| Col. 11, line 57 claim 18 | After "gas", insert --upon--. |
| Col. 12, line 5 claim 20 | After "water" insert --of--. |
| Col. 12, line 28 claim 21 | Change "first" to --fire--. |

Signed and Sealed this

Twenty-third Day of July, 1996

Attest:

BRUCE LEHMAN

Attesting Officer          Commissioner of Patents and Trademarks